US009596623B2

(12) United States Patent
Aksu et al.

(10) Patent No.: US 9,596,623 B2
(45) Date of Patent: Mar. 14, 2017

(54) SHARED SPECTRUM LOAD BALANCING

(71) Applicant: Verizon Patent and Licensing Inc., Arlington, VA (US)

(72) Inventors: Arda Aksu, Martinez, CA (US); Max A. Solondz, New Vernon, NJ (US); Yee Sin Chan, San Jose, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 114 days.

(21) Appl. No.: 14/456,756

(22) Filed: Aug. 11, 2014

(65) Prior Publication Data

US 2016/0044538 A1 Feb. 11, 2016

(51) Int. Cl.

| | |
|---|---|
| ***H04W 28/08*** | (2009.01) |
| ***H04W 36/22*** | (2009.01) |
| ***H04W 36/26*** | (2009.01) |
| ***H04W 52/40*** | (2009.01) |
| ***H04W 72/04*** | (2009.01) |

(52) U.S. Cl.

CPC ......... *H04W 28/085* (2013.01); *H04W 36/22* (2013.01); *H04W 36/26* (2013.01); *H04W 52/40* (2013.01); *H04W 72/0486* (2013.01); *Y02B 60/50* (2013.01)

(58) Field of Classification Search

CPC .... H04W 28/085; H04W 36/30; H04W 36/00

See application file for complete search history.

(56) References Cited

U.S. PATENT DOCUMENTS

| | | | | |
|---|---|---|---|---|
| 7,643,830 B2 * | 1/2010 | Catovic | ................. | H04W 36/30 455/436 |
| 2008/0002641 A1 * | 1/2008 | Hong | .................... | H04W 48/20 370/338 |
| 2015/0119035 A1 * | 4/2015 | Ganu | .................... | H04W 36/30 455/436 |
| 2015/0304852 A1 * | 10/2015 | El-Refaey | ............. | H04W 16/14 455/509 |

OTHER PUBLICATIONS

Cellular Frequencies, Wikipedia article, Jan. 27, 2012, https://en.wikipedia.org/wiki/Cellular_frequencies.*

Radio Spectrum Allocations 101,SpectrumWiki.com, Jul. 22, 2013, http://www.spectrumwiki.com/wp/allocations101.pdf.*

* cited by examiner

*Primary Examiner* — Noel Beharry
*Assistant Examiner* — Richard Schnell

(57) ABSTRACT

A wireless telecommunications system may be configured to provide wireless service via licensed and/or shared frequency bands (e.g., frequency bands that are shared with other telecommunications systems, and for which access is regulated by an external entity). A load balancing technique, described herein, may provide load balancing between licensed and shared frequency bands based on traffic type (e.g., real-time or non-real-time traffic) and/or based on device type (e.g., whether a device is typically involved in real-time communications). Techniques described herein may also provide for the staggered or gradual reduction of the transmit power of a radio associated with a shared frequency band (e.g., in response to an instruction from the external entity), in order to minimize the abrupt increase in load on other frequency bands that may result from reducing coverage of the shared frequency band.

20 Claims, 9 Drawing Sheets

Licensed band 1 (L1) high load
Licensed band 2 (L2) low load
Shared band 1 (S1) high load
Shared band 2 (S2) low load
Voice call
Web browsing
UD1
UD2
Base station

SHARED SPECTRUM LOAD BALANCING

BACKGROUND

User devices, such as wireless telephones may wirelessly connect, or "attach," to a wireless network via a base station. The base station may provide multiple carriers, to which the user devices may attach. As used herein, a particular "carrier" may refer to a particular radio access technology, a particular frequency band, and/or a particular set of frequencies within a frequency band. The frequency bands, provided by the base station, may include licensed frequency bands. "Licensed" frequency bands may be frequency bands which have been licensed, by an authoritative entity, such as a government agency, for exclusive use by a particular wireless network service provider. In some situations, the base station may also provide service according to one or more shared frequency bands. "Shared" frequency bands may be frequency bands that have been authorized (e.g., by an authoritative entity) for use by multiple wireless network service providers.

DETAILED DESCRIPTION OF PREFERRED EMBODIMENTS

The following detailed description refers to the accompanying drawings. The same reference numbers in different drawings may identify the same or similar elements.

Wireless network service providers may obtain licenses (e.g., exclusive or priority licenses) to operate wireless networks at certain frequency bands ("licensed" frequency bands). Wireless network service providers may also obtain licenses to operate wireless networks at shared frequency bands, which may be shared with other wireless network service providers. Access to a shared frequency band may be controlled by an owner or an incumbent associated with the shared frequency band, or an authoritative entity (such as a governmental agency). In some situations, a shared access system ("SAS") manager may provide control messages to licensees of a shared frequency band, which may indicate permissions or other parameters by which licensees of the shared frequency band may operate (e.g., an amount of load permitted for a particular licensee to incur on the shared frequency band, a transmit strength permitted for a radio that operates at the shared frequency band, etc.).

Figure 1:
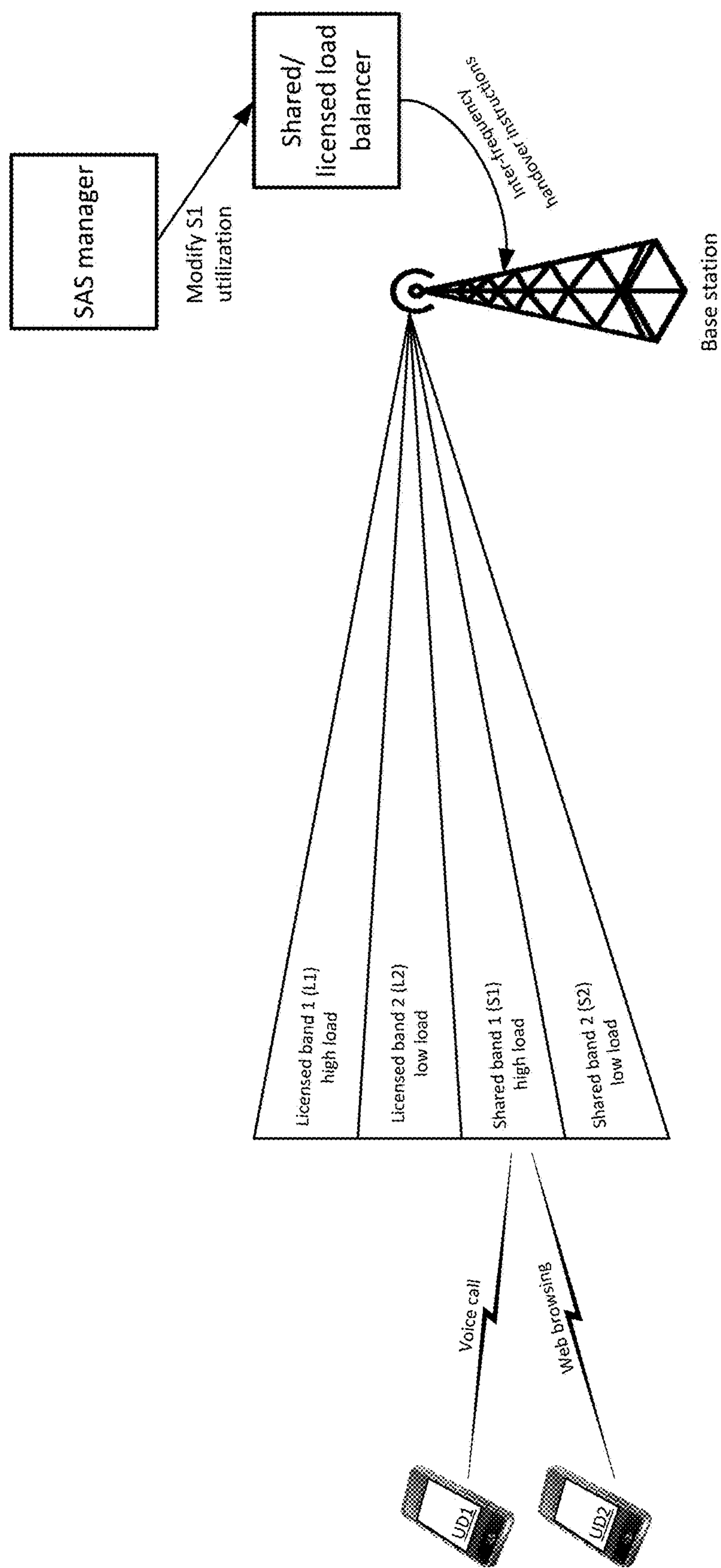
FIGS. 1 and 2 illustrate an example overview of one or more implementations described herein, in which load balancing may be performed in a network that includes service for licensed and shared frequency bands.

Systems and methods, provided herein, may provide techniques for load balancing among licensed frequency bands and shared frequency bands. For example, as shown in FIG. 1, a base station may provide radio service according to two licensed frequency bands ("L1" and "L2") and two shared frequency bands ("S1" and "S2"). As shown, two user devices ("UD1" and "UD2") may be connected to the base station via S1. In this example, L1 and S1 may be associated with a relatively high measure of load (e.g., a relatively large number of user devices may be connected to the base station via L1 and/or S1), and L2 and S2 may be associated with a relatively low measure of load. As further shown, UD1 may be on an active voice call, while UD2 may be involved in a web browsing session.

An SAS manager may provide an instruction to the base station and/or to a shared/licensed ("SL") load balancer, which may instruct the base station to modify the utilization of S1. For example, the instruction may instruct the base station to reduce the load, associated with S1, to a threshold level (e.g., a maximum quantity of connections via S1). The SL load balancer may determine whether the present load of S1 is above the specified threshold load, and may determine which band or bands to which UD1 and UD2 should be handed off, in order to satisfy the threshold. For example, as described below, the SL load balancer may make load balancing decisions based on, for example, a type of traffic associated with a user device (e.g., whether the traffic is "real-time" traffic, such as a voice call or a video call) and/or a type of the user device (e.g., whether the user device is a type of device that is typically associated with "non-real-time" communications, such as a tablet device or a machine to machine ("M2M") device).

Figure 2:
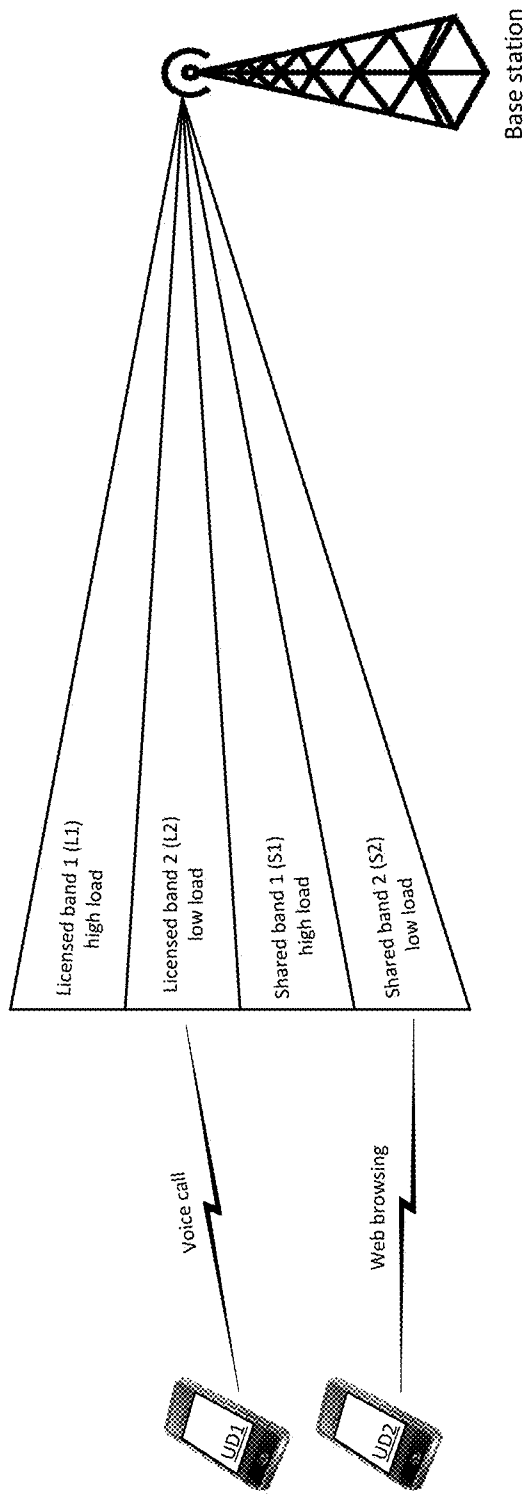

FIG. 2 illustrates a result of the example load balancing instruction, provided by the SL load balancer in FIG. 1. As shown, based on the load balancing instruction, UD1 may be handed off to L2 (i.e., the less loaded licensed band), since UD1 is associated with a real-time communication (e.g., an active voice call). As further shown, UD2 may be handed off to S2 (i.e., the less loaded shared band), since UD2 is not associated with a real-time communication. As mentioned above, other factors may be taken into account when determining which bands to hand UD1 and UD2 off to, such as types of the devices. In this example, UD2 may be a tablet device, which may also be a factor in the determination made by the SL load balancer. By performing load balancing, between licensed and shared frequency bands, based on traffic type and device type, a network provider may provide seamless wireless service to user devices, according to their needs, while also efficiently utilizing shared frequency bands, without negatively impacting incumbents or other users of the shared frequency bands.

Figure 3:
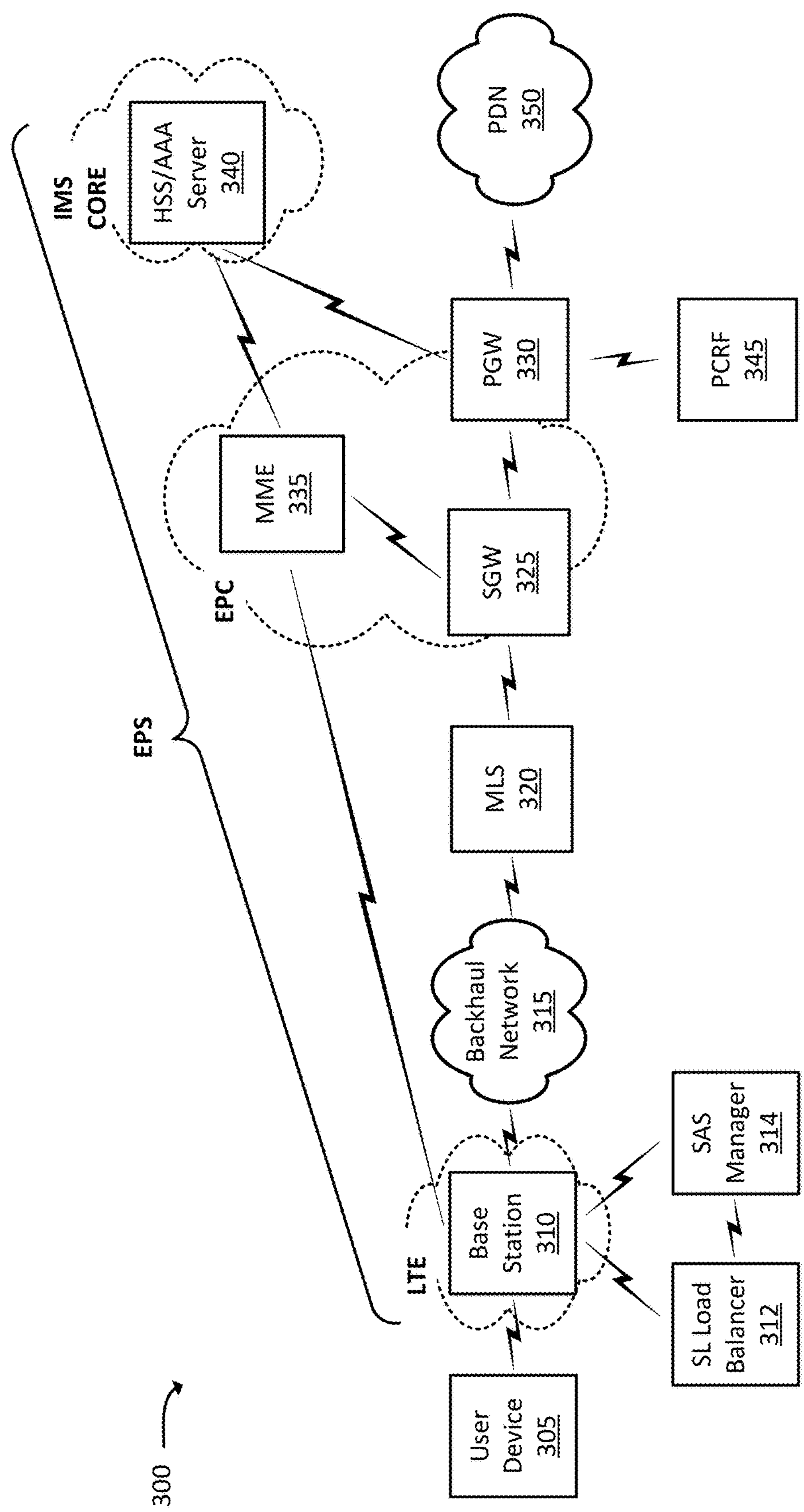
FIG. 3 illustrates an example environment, in which systems and/or methods, described herein, may be implemented.

FIG. 3 illustrates example environment 300, respectively, in which systems and/or methods described herein may be implemented. As shown in FIG. 3, environment 300 may include user device 305, base station 310, SL load balancer 312, SAS manager 314, backhaul network 315, multi-layer switch ("MLS") 320, serving gateway ("SGW") 325, packet data network ("PDN") gateway ("PGW") 330, mobility management entity device ("MME") 335, home subscriber server ("HSS")/authentication, authorization, accounting ("AAA") server 340 (hereinafter referred to as "HSS/AAA server 340"), policy and charging rules function ("PCRF") 345, and PDN 350.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 310, some or all of which may take the form of an evolved node B ("eNB"), via which user device 305 may communicate with the EPC network. The EPC network may include one or more SGWs 325, PGWs 330, and/or MMEs 335, and may enable user device 305 to communicate with PDN 350 and/or an Internet protocol ("IP") multimedia subsystem ("IMS") core network. The IMS core network may include HSS/AAA server 340, and may manage authentication, session initiation, account information, a user profile, etc., associated with user device 305.

User device 305 may include any computation and communication device, such as a wireless mobile communication device that is capable of communicating with base station 310 and/or PDN 350. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from PDN 350 via base station 310, backhaul network 315, MLS 320, SGW 325, and/or PGW 330.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Additionally, or alternatively, one or more other base stations 310 may be associated with a RAN that is not associated with the LTE network (e.g., a wireless hot spot, a wireless access point, etc.). Base station 310 may receive traffic from and/or send traffic to user device 305 via SGW 325, PGW 330, and/or PDN 350. Base station 310 may send traffic to and/or receive traffic from user device 305 via, for example, an air interface (e.g., a cellular air interface).

Base station 310 may be associated with one or more cells. A "cell," as used to herein, may generally refer to a coverage area provided by base station 310. A particular cell may, for example, be associated with one or more radios pointed in the same general direction. The different radios may each be associated with a particular frequency band, and/or more than one radio may be associated with a particular frequency band. For example, one or more radios may be associated with a licensed frequency band, while one or more other radios of the cell may be associated with a shared frequency band. Base station 310 may include processing logic and/or hardware circuitry that may enable base station 310 to perform inter-frequency handovers. For example, base station 310 may hand over a particular user device 305 from one frequency band to another frequency band (e.g., from a licensed frequency band to another licensed frequency band, from a shared frequency band to another shared frequency band, from a shared frequency band to a licensed frequency band, or from a licensed frequency band to a shared frequency band). Base station 310 may also perform intra-frequency handovers (e.g., hand over a particular user device 305 from one sub-band to another sub-band of a particular frequency band), and/or may perform inter-radio access technology ("RAT") handovers (e.g., may hand over a particular user device 305 from one RAT to another RAT). Base station 310 may modify parameters, such as radio transmit strength, associated with shared frequency bands based on access permissions provided by SAS manager 314.

SL load balancer 312 may include one or more devices that perform load balancing of user devices 305, with respect to various carriers (where a "carrier" may refer to a particular frequency band, a particular frequency sub-band, and/or a particular RAT) associated with base station 310. For example, SL load balancer 312 may determine measures of load associated with particular carriers, associated with base station 310, and may make handover decisions based on the measures of load. For example, if a first carrier is relatively overloaded, while a second carrier is relatively underutilized, SL load balancer 312 may output an instruction to base station 310 to hand over one or more user devices 305, connected to the first carrier, to the second carrier. As described herein, the load balancing decisions, made by SL load balancer 312, may be based on one or more other factors. For instance, SL load balancer 312 may make load balancing decisions based on access permissions, to shared frequency bands, provided by SAS manager 314. Additionally, or alternatively, SL load balancer 312 may make load balancing decisions based on factors such as a device type of user device 305 and/or a traffic type associated with user device 305.

While one base station 310 and one SL load balancer 312 are shown in FIG. 3 (e.g., a one-to-one arrangement), other arrangements are possible in practice. For example, in some implementations, one SL load balancer 312 may perform load balancing for multiple base stations 310. In some implementations, some portions of SL load balancer 312 (e.g., as discussed below with respect to FIG. 4) may perform some functionality associated with multiple base stations 310, while other portions of SL load balancer 312 may be arranged on a one-to-one basis with base stations 310.

SAS manager 314 may include one or more devices that provide information, such as access permissions, to base station 310 and/or SL load balancer 312. The access permissions may indicate, for example, a level of access permitted to a particular shared frequency band. For example, access permissions may indicate a maximum transmit strength associated with a particular shared frequency band, may specify a permissible coverage area or radius associated with a particular shared frequency band, and/or may indicate a maximum measure of permissible load (e.g., a maximum quantity of permitted user devices 305, a maximum amount of permitted throughput, etc.) associated with a particular shared frequency band. SAS manager 314 may be owned by, operated by, managed by, and/or receive information from an entity that owns a license to operate and/or control access to a shared frequency band, such as an incumbent and/or a governmental agency.

Backhaul network 315 may include one or more network devices (e.g., routers and/or switches) and links (e.g., fiber or coaxial links), that connect base station 310 to a core network (e.g., a core network that includes and/or is associated with MLS 320, SGW 325, and/or PGW 330).

MLS 320 may include one or more network devices that perform switching functionality on traffic received from SGW 325 and/or backhaul network 315. MLS 320 may operate multiple layers of the Open Systems Interconnection ("OSI") reference model, in contrast with other types of switches that traditionally operate only on the Data Link Layer ("DLL"). For example, MLS 320 may perform deep packet inspection to perform routing functions.

SGW 325 may include one or more network devices that gather, process, search, store, and/or provide information in a manner described herein. SGW 325 may, for example, aggregate traffic received from one or more base stations 310 and may send the aggregated traffic to PDN 350 via PGW 330.

PGW 330 may include one or more network devices that gather, process, search, store, and/or provide information in a manner described herein. PGW 330 may aggregate traffic received from one or more SGWs 325, etc. and may send the aggregated traffic to PDN 350. PGW 330 may also, or alternatively, receive traffic from PDN 350 and may send the traffic toward user device 305 via base station 310, and SGW 325.

MME 335 may include one or more computation and communication devices that perform operations to register user device 305 with the EPS, to establish bearer channels associated with a session with user device 305, to hand off user device 305 from the EPS to another network, to hand off user device 305 from the other network to the EPS, and/or to perform other operations. MME 335 may perform policing operations on traffic destined for and/or received from user device 305.

HSS/AAA server 340 may include one or more devices that manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 305); information regarding services to which particular subscribers are subscribed (e.g., communication services, such as video conferencing services, voice chat services, etc.); and/or other information. Additionally, or alternatively, HSS/AAA server 340 may perform authentication, authorization, and/or accounting operations associated with the subscriber and/or a communication session with user device 305.

PCRF 345 may include one or more devices that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

PDN 350 may include one or more wired and/or wireless networks. For example, PDN 350 may include an Internet Protocol ("IP")-based PDN, a wide area network ("WAN") such as the Internet, a core network of a telecommunications provider, a private enterprise network, and/or one or more other networks. User device 305 may connect, through PGW 330, to data servers, application servers, other user devices 305, content provider 275, and/or to other servers or applications that are coupled to PDN 350. PDN 350 may be connected to one or more other networks, such as a public switched telephone network ("PSTN"), a public land mobile network ("PLMN"), and/or another network. While "direct" connections are shown in FIG. 3 between certain devices, some devices may communicate with each other via PDN 350. For example, SAS manager 314 may communicate with base station 310 and/or SL load balancer 312 indirectly, such as via PDN 350 and/or another network.

Figure 4:
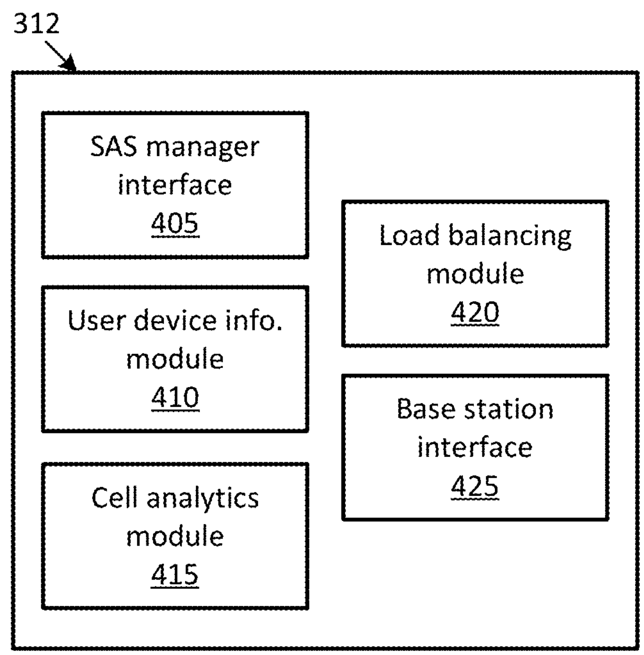
FIG. 4 illustrates example functional components of a shared/licensed load balancer, in accordance with one or more implementations.

FIG. 4 illustrates example functional components of SL load balancer 312, in accordance with some implementations. As shown, SL load balancer 312 may include SAS manager interface 405, user device information module 410, cell analytics module 415, load balancing module 420, and load balancing module 420. In other implementations, the SL load balancer 312 may include additional, fewer, different, and/or differently arranged modules. Further, the functionality of one module may be performed by one or more other modules. Also, the functionality of multiple modules may be performed by one module.

SAS manager interface 405 may include an interface, which may be an implementation of a particular application programming interface ("API"), via which SL load balancer 312 may receive communications from SAS manager 314. The API may, in some implementations, be defined by an owner and/or operator of SAS manager 314. Additionally, or alternatively, messaging and/or security protocols, via which SL load balancer 312 and SAS manager 314 communicate, may be defined by an owner and/or operator of SAS manager 314. The communications may include, for example, access permissions associated with one or more shared frequency bands associated with one or more base stations 310.

User device information module 410 may receive and/or store information regarding user devices 305, connected to base station 310. For example, user device information module 410 may receive the information from base station 310 and/or another device that obtains and/or stores user device information. In some implementations, user device information module 410 may request user device information directly from user devices 305. The user device information may include, for example, information indicating a device type (e.g., whether the device is a mobile telephone, a tablet device, an M2M device, a desktop computer, etc.) and/or a type of traffic presently being sent and/or received by the device (e.g., voice call traffic, video call traffic, file transfer traffic, web browsing traffic, instant messaging traffic, etc.). User device information module 410 may additionally, or alternatively, receive other information, such as received signal strength indicator ("RSSI") values associated with user devices 305. For example, a particular RSSI value may indicate a received signal strength, for a particular user device 305, of a signal via a particular carrier.

Cell analytics module 415 may receive and/or store analytics information regarding one or more cells associated with base station 310. For example, the cell analytics information may indicate how loaded the cells are, and may be on a per-carrier basis. For a particular cell, the cell analytics information may indicate how loaded each carrier, associated with the particular cell, is. For instance, a particular carrier may be considered as being highly "loaded" when a relatively large quantity of user devices 305 are connected to base station 310 via the carrier. As another example, a measure of load may indicate how many resource blocks, associated with a particular carrier have been utilized, and/or how many resource blocks are available. Cell analytics module 415 may receive analytics information regarding one cell (e.g., carriers associated with one cell) or more than one cell (e.g., carriers associated with two or more cells). Cell analytics module 415 may receive the analytics information from base station 310 and/or from another device (e.g., a device that communicates with one or more base stations 310 in order to determine the analytics information). The cell analytics information may be real time, or near-real time information. For example, cell analytics module 415 may receive up-to-date analytics information, as the information is collected or generated.

Figure 5:
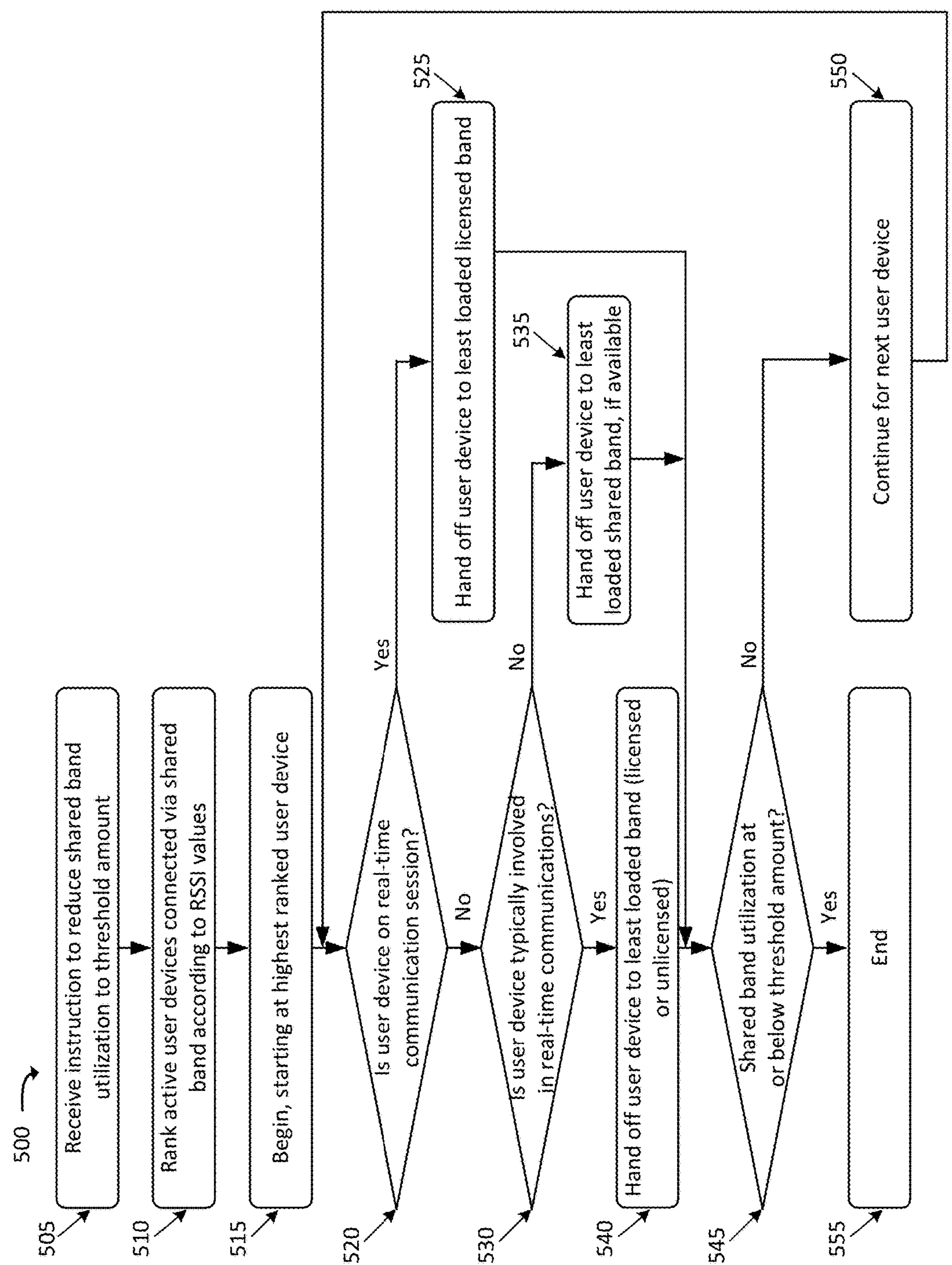
FIG. 5 illustrates an example process for performing load balancing among licensed and shared frequency bands.

Load balancing module 420 may perform load balancing operations based on shared access permissions (e.g., received from SAS manager interface 405), user device information (e.g., received from user device information module 410), and/or analytics information (e.g., received from cell analytics module 415). For example, load balancing module 420 may receive access permission information, for a particular shared frequency band, indicating a maximum level of load for the particular shared frequency band. Load balancing module 420 may determine, based on cell analytics information, whether the particular shared frequency band is overloaded. If the particular shared frequency band is overloaded, load balancing module 420 may determine which user device(s) 305 to hand over to a different frequency band, and may further determine to which frequency band(s) user device(s) 305 should be handed over. FIG. 5, described below, illustrates an example implementation of how load balancing module 420 may perform the load balancing. In some implementations, and/or in some situations, load balancing module 420 may additionally perform "conventional" load balancing, in which load balancing decisions may be made without regard to whether a particular carrier is associated with a shared frequency band or a licensed frequency band. Additionally, or alternatively, load balancing module 420 may be used in conjunction with a "conventional" (or other) load balancer.

Base station interface 425 may include an interface, such as an implementation of an API and/or another type of interface, via which SL load balancer 312 may communicate with one or more base stations 310. For example, SL load balancer 312 may receive information regarding user devices 305 (e.g., RSSI information, traffic type information, device type information) and/or carriers associated with base station 310 (e.g., cell analytics information) via base station interface 425. SL load balancer 312 may output instructions, such as handover instructions, to base station 310 via base station interface 425.

FIG. 5 illustrates an example process 500, in which load balancing may be performed by SL load balancer 312 (e.g., by one or more of modules 405-425, described above with respect to FIG. 4). In some implementations, process 500 may be performed by, or in conjunction with, one or more other devices in addition to, or in lieu of, SL load balancer 312.

As shown, process 500 may include receiving (at 505) an instruction to reduce the utilization of a shared frequency band to a threshold amount. For example, SL load balancer 312 may receive (e.g., via SAS manager interface 405) an instruction from SAS manager 314, indicating a threshold measure of load for the shared frequency band. The threshold measure of load may indicate a permissible amount of load that a particular base station 310 may utilize via the shared frequency band. The threshold measure of load may correspond to, in some situations, a non-zero measure of load that is lower than an amount of load presently (e.g., at the time the instruction is received) being utilized, via the shared frequency band, by base station 310.

Process 500 may also include ranking (at 510) active user devices connected via the shared frequency band according to RSSI values. For example, as described above, SL load balancer 312 may store and/or receive (e.g., via base station interface 425 and/or another interface) RSSI values associated with user devices 305 that are connected to base station 310 via the shared frequency band. SL load balancer 312 may rank active user devices 305 (e.g., user devices 305 that are involved in ongoing communication sessions) based on the RSSI values. The "highest" ranked user device 305, in accordance with some implementations, may be the particular user device 305 with the highest RSSI value.

Process 500 may include a looping set of blocks 520-550, which may begin (at 515) with the highest ranked user device (e.g., the particular user device 305 with the highest-ranked RSSI value). Blocks 520-550 may be performed iteratively for multiple user devices 305, and are described below in the context of a single iteration for a single particular user device 305.

Process 500 may include determining (at 520) whether the particular user device is presently involved in a real-time communication session. For example, SL load balancer 312 may determine a type of the active communication session by, for example, receiving information from base station 310 or another device, that may indicate the type of the active communication session. For example, the type of communication session may be determined based on contents of traffic being sent to and/or from user device 305 (e.g., using deep packet inspection), based on traffic header information (which may indicate, for instance one or more protocols via which the traffic is being sent and/or an application associated with the traffic), and/or based on other information (e.g., information generated by or provided from another source, such as from user device 305, a network device that routes the traffic, and/or from a communication server with which user device 305 communicates). For example, the type of traffic (e.g., voice call traffic, video call traffic, file transfer traffic, etc.) may be determined based on protocols or codecs indicated the header information or the content of the traffic, and/or may be explicitly identified in information provided from another source.

Certain types of traffic (such as voice call traffic or video call traffic) may be considered to be associated with "real-time," or "time-sensitive," communication sessions, while other types of traffic may be considered to be associated with "non-real-time," or "non-time-sensitive," communication sessions (such as file transfer traffic, web browsing traffic, video streaming traffic, etc.). In some implementations, certain types of traffic may be specifically designated as being associated with real-time communications, and types of traffic that have not been so designated may be considered as not being associated with real-time communications.

If the user device is involved in a real-time communication session (at 520—YES), then process 500 may include handing off (at 525) the user device to the least loaded licensed band. For example, SL load balancer 312 may generate an instruction that causes base station 310 to hand user device 305 over from the shared frequency band to the least loaded licensed band associated with base station 310. For instance, as mentioned above, SL load balancer 312 may identify the least loaded licensed frequency band based on cell analytics information (e.g., as received by cell analytics module 415). The term "handing off," as used herein, may refer to the generating of an instruction that causes base station 310 to hand user device 305 from one carrier to another (or otherwise notifying base station 310 that user device 305 should be handed over from one carrier to another).

If the user device is not involved in a real-time communication session (at 520—NO), then process 500 may include determining (at 530) whether the user device is a type of device that is typically involved in real-time communications. For example, as described above with respect to user device information module 410, SL load balancer 312 may receive and/or store information identifying a device type associated with user device 305. The device type information may indicate, for example, whether user device 305 is a mobile telephone, a tablet computer, an M2M device, a desktop computer, and/or another type of device. Additionally, or alternatively, the user device information may include a hardware or a part number, based on which the device type may be determined (e.g., based on comparing the hardware or part number to data that correlates hardware or part numbers to device names and/or device types).

Certain types of devices may be considered as devices that are "typically involved in real-time communications," such as mobile telephones, while other types of devices may be considered as devices that are "not typically involved in real-time communications," such as tablet computers, M2M devices, or desktop computers. In some implementations, certain types of devices may be specifically designated as being typically involved in real-time communications, and devices that have not been so designated may be considered as not typically involved in real-time communications.

If the user device is not of a type that is typically involved in real-time communications (at block 530—NO), then process 500 may include handing off (at 535) the user device to the least loaded shared frequency band available. For example, SL load balancer 312 may generate an instruction that causes base station 310 to hand user device 305 over from the shared frequency band to the least loaded available shared frequency band associated with base station 310 (i.e., a different band than the shared frequency band via which user device 305 is presently connected). For instance, as mentioned above, SL load balancer 312 may identify the least loaded shared frequency band based on cell analytics information (e.g., as received by cell analytics module 415).

If no shared frequency bands are available (at 535), then SL load balancer 312 may hand off user device 305 to a licensed frequency band. For instance, SL load balancer 312 may hand off user device 305 to the least loaded licensed frequency band. Additionally, or alternatively, SL load balancer 312 may identify a licensed frequency band, other than the least loaded licensed frequency band, using other load balancing techniques, and may hand off user device 305 to the identified licensed frequency band.

If the user device is not involved in a real-time communication session, and is of a type that is typically involved in real-time communications (at 520—NO and 530—YES), then process 500 may include handing off (at 540) the user device to the least loaded available frequency band (e.g., without regard to whether the frequency band is a licensed frequency band or a shared frequency band). Additionally, or alternatively, SL load balancer 312 may identify a band, other than the least loaded frequency band, using other load balancing techniques, and may hand off user device 305 to the identified frequency band. In some implementations, in lieu of handing off (at 540) user device 305 to another frequency band, SL load balancer 312 may forgo handing off user device 305, and user device 305 may remain on the same shared frequency band. Due to the iterative nature of process 500, user device 305 may be handed off at a later time (e.g., during another iteration of process 500 and/or as part of a different process).

Once a handover decision has been made (e.g., at 525, 535, or 540), process 500 may include determining (at 545) whether the utilization of the shared frequency band is at or below the threshold amount. For example, SL load balancer 312 may receive cell analytics information (e.g., via cell analytics module 415) regarding the shared frequency band. The cell analytics information may reflect an amount of load associated with the shared frequency band after user device 305 has been handed over (e.g., at 525, 545, or 540).

If the utilization of the shared frequency band is not at or below the threshold amount (at 545—NO), then blocks 520-550 may be iteratively repeated ("continue for next user device" at 550) for the next most highly-ranked device in the ranking (generated at 510). If blocks 520-550 have been performed for all user devices 305 connected to a particular base station 310, process 500 may cease. In some implementations, some or all of process 500 may be repeatedly in an iterative manner if blocks 520-550 have been performed for all user devices 305 connected to a particular base station 310. For example, after blocks 520-550 have been performed for the lowest-ranked user device 305, portions of process 500 (e.g., blocks 510-550) may be repeated. That is, for example, a new ranking may be generated (at 510), and blocks 515-550 may be iteratively performed based on the new ranking, and/or blocks 515-500 may be iteratively performed based on the previous ranking. If, on the other hand, the utilization of the shared frequency band is at or below the threshold amount (at 545—YES), then process 500 may end (at 555).

Figure 6:
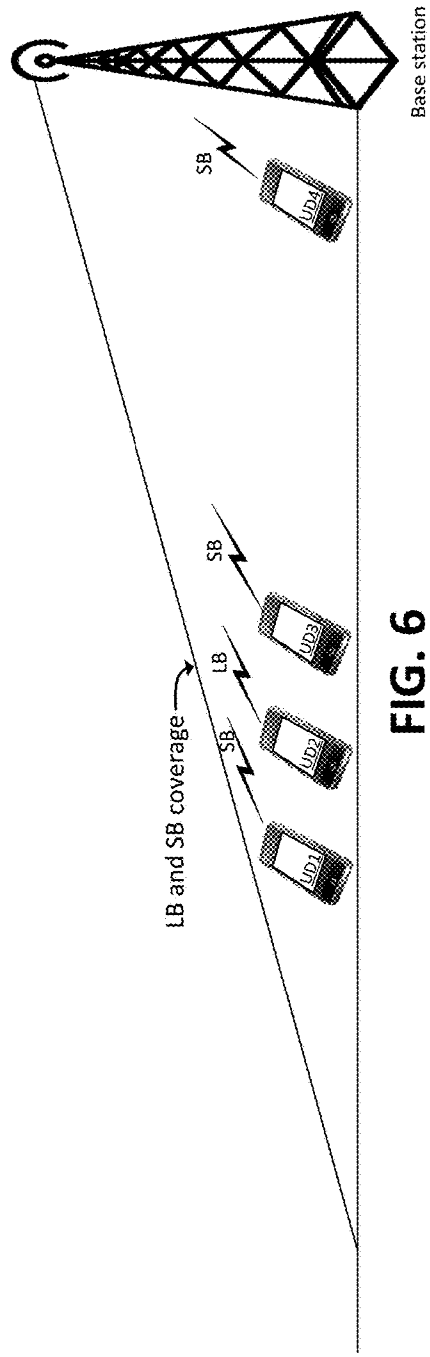
FIGS. 6 and 7 illustrate an example situation in which the transmit power, of a particular shared frequency band, is reduced in response to an instruction from a shared access system ("SAS") manager.
Figure 7:
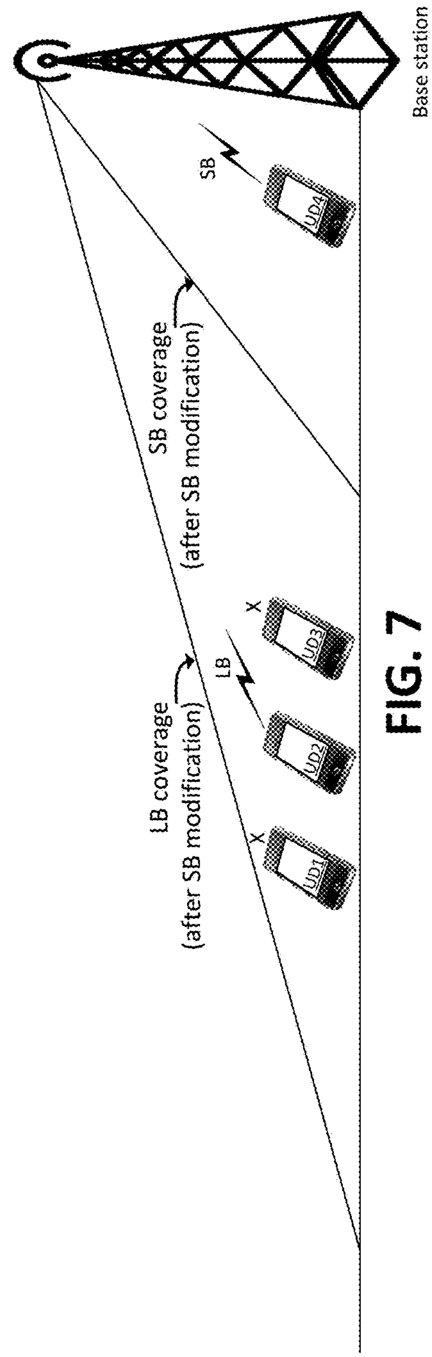

FIGS. 6 and 7 illustrate an example situation in which the transmit power, of a particular shared frequency band, is reduced in response to an instruction from SAS manager 314. For example, as mentioned above, SAS manager 314 may instruct base station 310 to reduce the transmit power of a radio that operates at a particular shared frequency. The instruction may be made when, for example, other operators (such as an incumbent or another operator that has been permitted to use the shared frequency band) are in relatively close proximity. In this situation, reducing the transmit power may aid in alleviating or eliminating radio frequency ("RF") interference that may be experienced by base station 310 and the other operator.

As shown in FIG. 6, four user devices ("UD1," "UD2," "UD3," and "UD4") may be connected to a base station. UD1, UD3, and UD4 may be connected via a shared frequency band ("SB"), while UD2 may be connected via licensed frequency band ("LB"). In the example shown in FIG. 6, the relative coverage areas (e.g., the distance from the base station in which user devices can receive wireless service) of LB and SB are approximately equal. Thus, since UD1-UD4 are within the respective coverage areas of LB and SB, UD1-UD4 may receive wireless service (as indicated by the "SB" and "LB" markings, as well as the connection indicator in the figure).

As shown in FIG. 7, the base station may have modified the transmit power of a radio associated with SB ("SB modification"), thus reducing the coverage area of SB. For example, the transmit power may have been reduced based on an instruction from SAS manager 314. Based on modifying the transmit power of the SB radio, UD1 and UD3, which are outside of the new SB coverage area, may not receive service via SB (as indicated by the "X" over UD1 and UD3 in the figure). In order to receive wireless service, UD1 and UD3 may search for the base station using other carriers, such as LB.

In situations where many user devices are utilizing a shared frequency band, abruptly reducing the radio transmit power may cause an overload at the base station, which may receive a large number of new connection requests over licensed carriers (or other carriers of which user devices are in range). Thus, it may be beneficial to reduce transmit power of a radio, associated with a shared band, in a staggered manner, so that the base station can handle multiple smaller groups of new connection requests as opposed to attempting to handle a large number of new connection requests at once.

Figure 8:
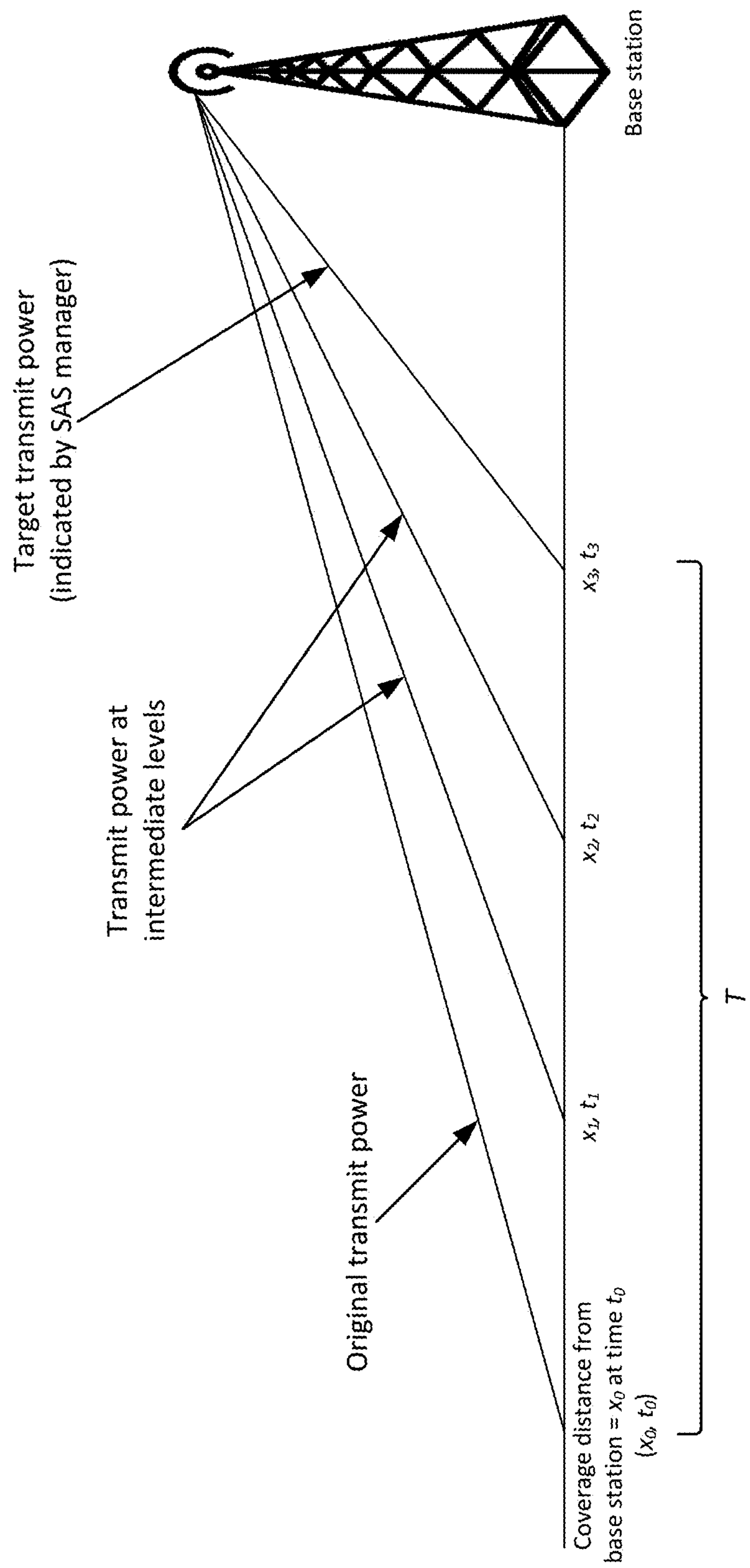
FIG. 8 illustrates an example of reducing the transmit power of a radio, associated with a shared frequency band, in a gradual or staggered manner.

FIG. 8 illustrates an example of reducing the transmit power, of a particular radio associated with a shared frequency band, in a staggered manner. For instance, the original transmit power, provided at time $t_0$, may provide a coverage distance that is $x_0$ distance units away from the base station. An instruction may be provided to the base station, indicating a new transmit power ("transmit power") that should be used by the base station for the particular radio. Additionally, or alternatively, the instruction may indicate a maximum distance (e.g., $x_3$ distance units in the figure), from the base station, that the base station is authorized to operate the shared frequency band.

The base station may reduce the transmit power of the particular radio over a particular duration of time T, which may be the difference between times $t_0$ and $t_3$. In some implementations, the time T may be specified by the instruction from SAS manager 314, and/or may be derived from the instruction provided by SAS manager 314. For example, the instruction may specify an absolute time at which the transmit power should be reduced to the target transmit power, and/or may specify an amount of time (from which the instruction was sent and/or received) after which the transmit power should be reduced to the target transmit power.

At intermediate times $t_1$ and $t_2$ between times $t_0$ and $t_3$, the transmit power of the particular radio may be progressively reduced to intermediate levels (e.g., power levels between the original and target transmit powers), such that the resulting coverage distances are, respectively, $x_1$ and $x_2$ (where $x_1$ and $x_2$ are intermediate distances between $x_0$ and $x_3$). In some implementations, the transmit power may be reduced in a discrete manner (e.g., distinct reductions at times $t_1$, $t_2$, and $t_3$). In some implementations, the transmit power may be reduced in a continuous manner. When reduced in a continuous manner, the transmit power may be reduced linearly, exponentially, logarithmically, and/or in another continuous manner.

The transmit powers, described with respect to the above example, may refer to maximum transmit powers. For example, at time $t_2$, the maximum transmit power for the radio may be a power at which coverage may be provided at a distance of $x_2$. However, for sub-carriers associated with certain user devices that are closer to the base station, the base station may provide the shared frequency band at a lower transmit power than the maximum transmit power at time $t_2$.

In other implementations, the transmit powers, described with respect to the above figure, may refer to the transmit power of the radio associated with the entire particular shared frequency band. That is, at time $t_2$ (for example), the transmit power of the radio may be set at the level at which coverage is provided at the distance of $x_2$.

Figure 9:
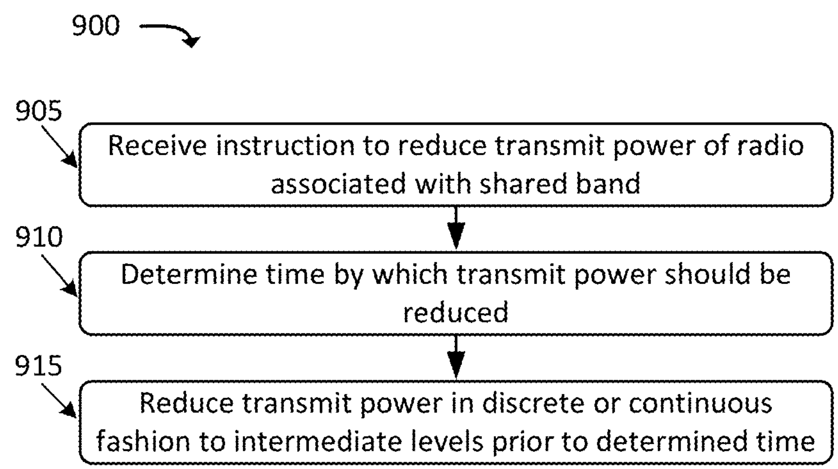
FIG. 9 illustrates an example process for reducing the transmit power of a radio, associated with a shared frequency band, in a gradual or staggered manner.

FIG. 9 illustrates an example process 900 for reducing the transmit power of a radio, associated with a shared frequency band, in a gradual or staggered manner. In some implementations, process 900 may be performed by base station 310. In other implementations, some or all of process 900 may be performed by one or more other devices, such as a computing device communicatively coupled to and/or integrated within base station 310.

As shown, process 900 may include receiving (at 905) an instruction to reduce the transmit power of a radio associated with a shared frequency band. For instance, base station 310 may receive the instruction from SAS manager 314. As mentioned above, the transmit power may be specified in the instruction (e.g., in terms of absolute power levels, such as a Decibel-milliwatt ("dBm") value), and/or may be derived from the instruction (e.g., in implementations where the instruction specifies a maximum coverage range, for the shared frequency band, for base station 310).

Process 900 may also include determining (at 910) a time by which the transmit power should be reduced to the specified transmit power. For example, the instruction may include an absolute time by which the transmit power should be reduced. As another example, the instruction may include a duration of time, from which the instruction was received by base station 310 and/or from another reference point, after which the transmit power should be reduced. As yet another example, other factors (such as conventions set forth in one or more standards) may influence or dictate the time which the transmit power should be reduced.

Process 900 may further include reducing (at 915) the transmit power in a discrete or continuous fashion to intermediate levels prior to the determined time. For example, as discussed above with respect to FIG. 8, base station 310 may reduce the transmit power to one or more levels that are between the original transmit power (e.g., before the instruction was received at 905) and the transmit power specified in the instruction.

Figure 10:
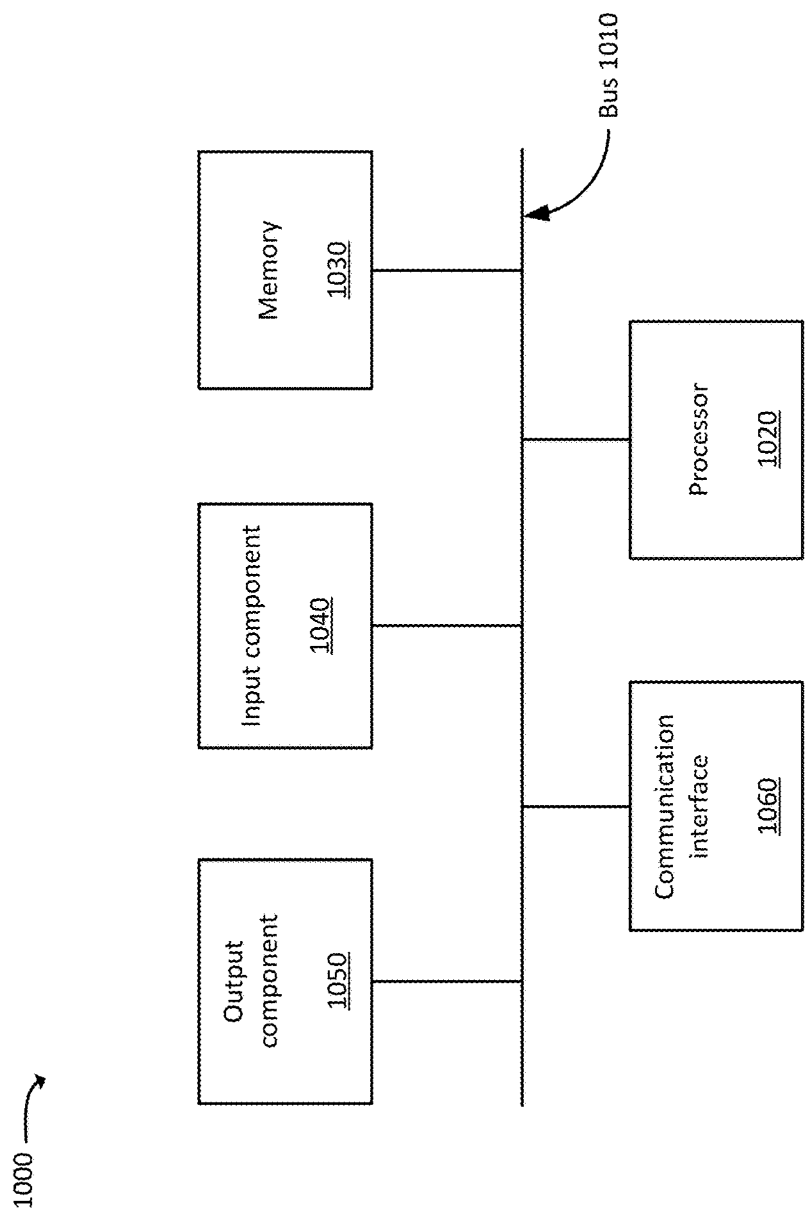
FIG. 10 illustrates example components of a device, in accordance with some implementations described herein.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 5 and 9, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Additionally, while the above disclosure describes implementations in the context of handovers between licensed and shared frequency bands, similar concepts may be used for handovers between other licensed and shared carriers. For example, the above techniques may be used to hand over a user device from a first carrier, that is associated with a first RAT and a licensed frequency band, to a second carrier that is associated with a second RAT and a shared frequency band. As another example, while FIGS. 6-8 were described in the context of a base station lowering the transmit power of a particular radio and/or determining a manner in which the transmit power of a radio should be lowered, in practice, an external device in communication with the base station may perform the determining, and/or may instruct the base station as to the manner in which the transmit power should be lowered. Furthermore, while described in the context of one carrier, a user device may be simultaneously connected to a base station via multiple carriers (e.g., one or more shared bands and/or one or more licensed band), and load balancing may be performed, in a manner consistent with the examples described above, with respect to one or more of the multiple carriers.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:

receiving, by a computing device, load information specifying a first load level associated with a first wireless frequency band provided by a base station of a wireless telecommunications network;

receiving, by the computing device, an instruction to reduce utilization of the first wireless frequency band provided by the base station, the instruction specifying a second load level, the second load level being less than the first load level;

determining, by the computing device, a manner in which to hand over one or more user devices, connected to the base station via the first wireless frequency band, to one or more other wireless frequency bands associated with the base station, the determining, for a particular user device of the one or more user devices, being based on:

whether a type of active communication session in which the particular user device is involved is a real-time communication session, and when the type of active communication session is not a real-time communication session, whether the particular user device corresponds to a type of user device that is capable of engaging in a real-time communication session;

generating, by the computing device, one or more handover instructions based on the determined manner in which to hand over the one or more user devices, the one or more handover instructions indicating to which respective wireless frequency band, of the one or more wireless frequency bands, each user device, of the one or more user devices, should be handed over; and outputting, by the computing device, the one or more handover instructions to the base station.

2. The method of claim 1, wherein the first wireless frequency band is a shared frequency band that is shared with one or more other wireless telecommunications networks.

3. The method of claim 1, wherein the instruction, to reduce the utilization of the first wireless frequency band, is received from an entity that controls access to the first wireless frequency band.

4. The method of claim 1, wherein the type of the active communication session is a real-time communication session, and wherein determining the manner in which the particular user device should be handed over includes:

determining that the particular user device should be handed over to a least loaded licensed frequency band associated with the base station.

5. The method of claim 4, wherein the wireless telecommunications network is associated with an entity that owns an exclusive license to the licensed frequency band.

6. The method of claim 1, wherein the real-time communication session includes at least one of:

a voice call, or a video call.

7. The method of claim 1, further comprising:

when the active communication session is not a real-time communication session and the particular user device corresponds to a type of user device that is not capable of engaging in the real-time communication session, determining that the particular user device should be handed over to a least loaded shared frequency band associated with the base station, wherein the least loaded shared frequency band is different from the first wireless frequency band, wherein access to the least loaded shared frequency band is controlled by an entity that is separate from an owner of the wireless telecommunications network.

8. The method of claim 1, further comprising:

receiving received signal strength indicator ("RSSI") values associated with the one or more user devices;

ranking the one or more user devices according to the received RSSI values;

performing, in an iterative manner for the one or more user devices, the determining in an order that is based on the ranking; and ceasing the iterative determining when the utilization of the first wireless frequency band meets or is below the specified second load level.

9. The method of claim 1, wherein the one or more handover instructions includes instructions to hand off the particular user device to a least loaded shared band, of the one or more other wireless frequency bands, when:

the active communication session includes a non-real-time communication session, and the particular user device corresponds to a type of user device that is not capable of engaging in the real-time communication session.

10. The method of claim 1, wherein the one or more handover instructions includes instructions to hand off the particular user device to a least loaded band among a first band and a second band of the one or more wireless frequency bands, the first band having an exclusive licensee and the second band having one or more licensees, when:

the active communication session includes a non-real-time communication session, and the particular user device corresponds to a type of user device that is capable of engaging in the real-time communication session.

11. A computing device, comprising:

a memory device storing a set of processor-executable instructions; and a processor configured to execute the processor-executable instructions, wherein executing the processor-executable instructions causes the processor to:

receive load information specifying a first measure of load associated with a first wireless frequency band provided by a base station of a wireless telecommunications network;

receive an instruction to reduce utilization of the first wireless frequency band by the base station, the instruction specifying a second measure of load, the second measure of load being less than the first measure of load;

determine a manner in which to hand over one or more user devices, connected to the base station via the first wireless frequency bands, to one or more other wireless frequency bands provided by the base station, the determining, for a particular user device of the one or more user devices, being based:

whether an active communication session in which the particular user device is involved is a real-time communication session, and when the type of active communication session is not a real-time communication session, whether the particular user device corresponds to a type of user device that is capable of engaging in a real-time communication session;

generate one or more handover instructions based on the determined manner in which to hand over the one or more user devices, the one or more handover instructions indicating to which respective wireless frequency band, of the one or more wireless frequency bands, each user device, of the one or more user devices, should be handed over; and output the one or more handover instructions to the base station.

12. The computing device of claim 11, wherein the first wireless frequency band is a shared frequency band that is shared with one or more other wireless telecommunications networks.

13. The computing device of claim 11, wherein the computing device is integrated in, or is communicatively coupled to, the base station.

14. The computing device of claim 11, wherein the type of the active communication session is a real-time communication session, wherein executing the processor-executable instructions, to determine the manner in which the particular user device should be handed over, further causes the processor to:

determine that the particular user device should be handed over to a least loaded licensed frequency band associated with the base station.

15. The computing device of claim 11, wherein a real-time communication session includes at least one of:

a voice call, or a video call.

16. The computing device of claim 11, wherein when executing the processor-executable instructions, to determine the manner in which the particular user device should be handed over, further causes the processor to:

when the active communication session includes a non-real-time communication session and the particular user device corresponds to a type of user device that is not capable of engaging in the real-time communication session, determine that the particular user device should be handed over to a least loaded shared frequency band associated with the base station, wherein the least loaded shared frequency band is different from the first wireless frequency band, wherein access to the least loaded shared frequency band is controlled by an entity that is separate from an owner of the wireless telecommunications network.

17. The computing device of claim 11, wherein executing the processor-executable instructions further causes the processor to:

receive received signal strength indicator ("RSSI") values associated with the one or more user devices;

rank the one or more user devices according to the received RSSI values;

perform, in an iterative manner for the one or more user devices, the determining in an order that is based on the ranking; and cease the iterative determining when the utilization of the first wireless frequency band meets or is below the specified second measure of load.

18. A non-transitory computer-readable medium, storing a plurality of processor-executable instructions, which, when executed by one or more processors, cause the one or more processors to:

receive load information specifying a first measure of load associated with a first wireless frequency band provided by a base station of a wireless telecommunications network;

receive an instruction to reduce utilization of the first wireless frequency band by the base station, the instruction specifying a second measure of load, the second measure of load being less than the first measure of load;

determine a manner in which to hand over one or more user devices, connected to the base station via the first wireless frequency bands, to one or more other wireless frequency bands provided by the base station, the determining, for a particular user device of the one or more user devices, being based:

whether an active communication session in which the particular user device is involved is a real-time communication session, and when the type of active communication session is not a real-time communication session, whether the particular user device corresponds to a type of user device that is capable of engaging in a real-time communication session;

generate one or more handover instructions based on the determined manner in which to hand over the one or more user devices, the one or more handover instructions indicating to which respective wireless frequency band, of the one or more wireless frequency bands, each user device, of the one or more user devices, should be handed over; and output the one or more handover instructions to the base station.

19. The non-transitory computer-readable medium of claim 18, wherein the first wireless frequency band is a shared frequency band that is shared with one or more other wireless telecommunications networks.

20. The non-transitory computer-readable medium of claim 18, wherein the processor-executable instructions further cause one or more instructions to:

receive received signal strength indicator ("RSSI") values associated with the one or more user devices;

rank the one or more user devices according to the received RSSI values;

perform, in an iterative manner for the one or more user devices, the determining in an order that is based on the ranking; and cease the iterative determining when the utilization of the first wireless frequency band meets or is below the specified second measure of load.

* * * * *